(12) United States Patent
Keeling et al.

(10) Patent No.: US 9,211,922 B2
(45) Date of Patent: Dec. 15, 2015

(54) ROBOTIC VEHICLE HAVING TRACTION AND MOBILITY-ENHANCED WHEEL STRUCTURES

(75) Inventors: Ariana Jacqueline Keeling, Durham, NC (US); Kirby Shane Cook, Cary, NC (US); Timothy Paul Kowalczyk, Chapel Hill, NC (US); Aaron Joseph Ruff, Apex, NC (US); Sean Michael McDonald, Cary, NC (US); Sean Michael Greene, Raleigh, NC (US); Marc Celestini, Raleigh, NC (US); Brian Alexander Nelson, Cary, NC (US)

(73) Assignee: Cardinal Gibbons High School, Raleigh, NC (US)

( * ) Notice: Subject to any disclaimer, the term of this patent is extended or adjusted under 35 U.S.C. 154(b) by 659 days.

(21) Appl. No.: 13/588,531

(22) Filed: Aug. 17, 2012

(65) Prior Publication Data

US 2014/0049098 A1 Feb. 20, 2014

(51) Int. Cl.
*B62D 55/20* (2006.01)
*B60B 15/22* (2006.01)

(52) U.S. Cl.
CPC ............... *B62D 55/20* (2013.01); *B60B 15/22* (2013.01); *B60B 2900/351* (2013.01)

(58) Field of Classification Search
CPC ...... B60B 15/00; B60B 15/02; B60B 15/023; B60B 15/025; B60B 15/18; B60B 15/22; B60B 25/002; B60B 25/02; B62D 55/20; B60C 27/20

USPC ............ 301/5.1, 41.1, 42, 43; 305/4, 6, 7, 19, 305/193, 196, 200; 152/185, 185.1
See application file for complete search history.

(56) References Cited

U.S. PATENT DOCUMENTS

| | | | |
|---|---|---|---|
| 130,892 A | 8/1872 | Brown |
| 252,348 A | 1/1882 | Benson |
| 275,035 A | 4/1883 | Gilbert |
| 373,887 A | 11/1887 | Fender |
| 384,797 A | 6/1888 | Tipping |
| 405,348 A | 6/1889 | Crandell |
| 675,710 A | 6/1901 | Bonagente |
| 817,539 A | 4/1906 | Young |
| 1,068,563 A | 7/1913 | Carr |
| 1,107,492 A | 8/1914 | Carr |
| 1,109,400 A | 9/1914 | Carr |
| 1,127,362 A | 2/1915 | Johnston |
| 1,134,960 A | 4/1915 | Riblet |

(Continued)

*Primary Examiner* — S. Joseph Morano
*Assistant Examiner* — Jean Charleston
(74) *Attorney, Agent, or Firm* — Haynes and Boone, LLP

(57) ABSTRACT

A robotic vehicle is provided with improved traction and mobility via a specially designed wheel apparatus including a relatively rigid wheel structure formed from two circular, coaxial sprocketed wheel plates separated by a central hub. The sprockets on the wheel plates are circumferentially aligned with one another, with axially facing sprocket pairs being received in areas defined between circumferentially adjacent pairs of tread links in a series of tread links, equal in number to the number of sprocket pairs, arranged in a circular array around the periphery of the wheel structure. The sprocket pairs are sized and configured in a manner such that substantial relative axial and circumferential movement between the wheel structure and the tread link array are blocked, with the axially facing sprockets in each sprocket pair being axially and resiliently deflected toward one another by surface portions of their associated tread link area.

20 Claims, 5 Drawing Sheets

(56) References Cited

U.S. PATENT DOCUMENTS

| | | | |
|---|---|---|---|
| 1,154,635 | A | 9/1915 | Hobson |
| RE14,200 | E | 10/1916 | Hobson |
| 1,373,905 | A | 4/1921 | Miller |
| 1,405,823 | A | 2/1922 | Evans |
| 1,414,735 | A | 5/1922 | Greenslade |
| 1,439,298 | A | 12/1922 | Dehetre |
| 1,492,695 | A | 5/1924 | Miller |
| 1,511,573 | A | 10/1924 | Miller |
| 1,535,846 | A | 4/1925 | Miller |
| 1,547,485 | A | 7/1925 | Zaradzki |
| 1,550,382 | A | 8/1925 | Miller |
| 1,559,973 | A | 11/1925 | Miller |
| 1,569,099 | A | 1/1926 | Miller |
| 1,597,454 | A | 8/1926 | Miller |
| 1,600,589 | A | 9/1926 | Hipkins |
| 1,732,484 | A | 10/1929 | Riblet |
| 1,810,854 | A | 6/1931 | Rimailho |
| 1,840,779 | A | 1/1932 | Johnston |
| 2,008,210 | A | 7/1935 | Hipkins |
| 2,046,299 | A | 6/1936 | Armington |
| 2,272,135 | A | 2/1942 | Singer |
| 2,346,089 | A | 4/1944 | Singer |
| 2,418,481 | A | 4/1947 | Riblet |
| 2,431,599 | A | 11/1947 | Wine |
| 2,437,407 | A | 3/1948 | Singer |
| 2,440,417 | A | 4/1948 | Singer |
| 2,668,736 | A | 2/1954 | Poche |
| 2,916,331 | A | 12/1959 | Gardner |
| 2,917,095 | A | 12/1959 | Galanot |
| 2,973,995 | A | 3/1961 | Weier |
| 2,986,429 | A | 5/1961 | Liebrecht |
| 3,083,063 | A | 3/1963 | Alfsen |
| 3,084,981 | A | 4/1963 | Liebrecht |
| 3,140,899 | A | 7/1964 | Weiss |
| 3,194,334 | A | 7/1965 | Staunau |
| 3,205,022 | A | 9/1965 | Eckert-Greifendorff et al. |
| 3,370,889 | A | 2/1968 | Tucker |
| 3,459,454 | A | 8/1969 | Liston |
| 3,533,663 | A | 10/1970 | Pianalto |
| 3,601,212 | A | 8/1971 | Peterson et al. |
| 3,612,624 | A | 10/1971 | Stedman |
| 3,620,278 | A | 11/1971 | Markow |
| 3,630,580 | A | 12/1971 | Grawey |
| 3,658,248 | A | 4/1972 | Williams |
| 3,773,394 | A | 11/1973 | Grawey |
| 3,776,291 | A | 12/1973 | Boggs |
| 3,779,616 | A | 12/1973 | Reisser |
| 3,964,797 | A | 6/1976 | Swanson |
| 4,010,789 | A | 3/1977 | Vidakovic et al. |
| 4,013,112 | A | 3/1977 | Vidakovic |
| 4,043,610 | A | 8/1977 | Halmosi et al. |
| 4,046,428 | A | 9/1977 | Bauer |
| 4,050,495 | A | 9/1977 | Olsen |
| 4,057,302 | A | 11/1977 | Caravito |
| 4,059,313 | A | 11/1977 | Beyers et al. |
| 4,070,071 | A | 1/1978 | Caravito |
| 4,258,768 | A | 3/1981 | Pamer et al. |
| 4,279,603 | A | 7/1981 | Harcourt et al. |
| 4,306,603 | A | 12/1981 | Dighe et al. |
| 4,328,849 | A | 5/1982 | Dighe et al. |
| 4,368,929 | A | 1/1983 | Beyers et al. |
| 4,408,646 | A | 10/1983 | Forsyth |
| 4,480,670 | A | 11/1984 | Payne |
| 4,810,043 | A | 3/1989 | McIntosh |
| 4,813,466 | A | 3/1989 | Forsyth et al. |
| 4,861,053 | A | 8/1989 | Yeomans, Jr. |
| 5,004,030 | A * | 4/1991 | McLaughlin ............ 152/225 R |
| 5,044,415 | A | 9/1991 | Ishihara |
| 5,078,454 | A | 1/1992 | Rollinson |
| 5,616,193 | A | 4/1997 | Nordstrom et al. |
| 5,842,756 | A | 12/1998 | Haws |
| 6,264,283 | B1 | 7/2001 | Rehkemper et al. |
| 6,299,265 | B1 | 10/2001 | Hoffart |
| 6,394,562 | B1 | 5/2002 | Sjostrom |
| 6,478,387 | B1 | 11/2002 | Rayman |
| 6,478,389 | B2 | 11/2002 | Doyle |
| 6,616,374 | B2 | 9/2003 | Starr |

\* cited by examiner

# ROBOTIC VEHICLE HAVING TRACTION AND MOBILITY-ENHANCED WHEEL STRUCTURES

BACKGROUND OF THE INVENTION

The present invention generally relates to vehicle wheel structures and, in a representatively illustrated embodiment thereof, more particularly relates to a specially designed treaded wheel structure for a robotic vehicle.

In the construction of small wheeled robotic vehicles which must traverse surfaces that may wind through circuitous paths and have combinations of substantial slopes, uneven configurations and somewhat slippery textures, one of the design challenges presented is to provide the vehicle with wheel systems incorporating a sufficient combination of both mobility and traction to successfully navigate surfaces of these types. From a general perspective it has been found that interconnecting two or more wheels with tank-like tread belts tends to undesirably lessen the desired mobility of the vehicle. On the other hand, providing the vehicle with non-interconnected single wheels often unacceptably reduces the level of traction of the vehicle.

In view of these design difficulties it can be seen that a need exists for a wheel design for a vehicle, such as a robotic vehicle, that provides the vehicle with enhanced mobility and drive traction. It is to this need that the present invention is primarily directed.

DETAILED DESCRIPTION

Figure 1:
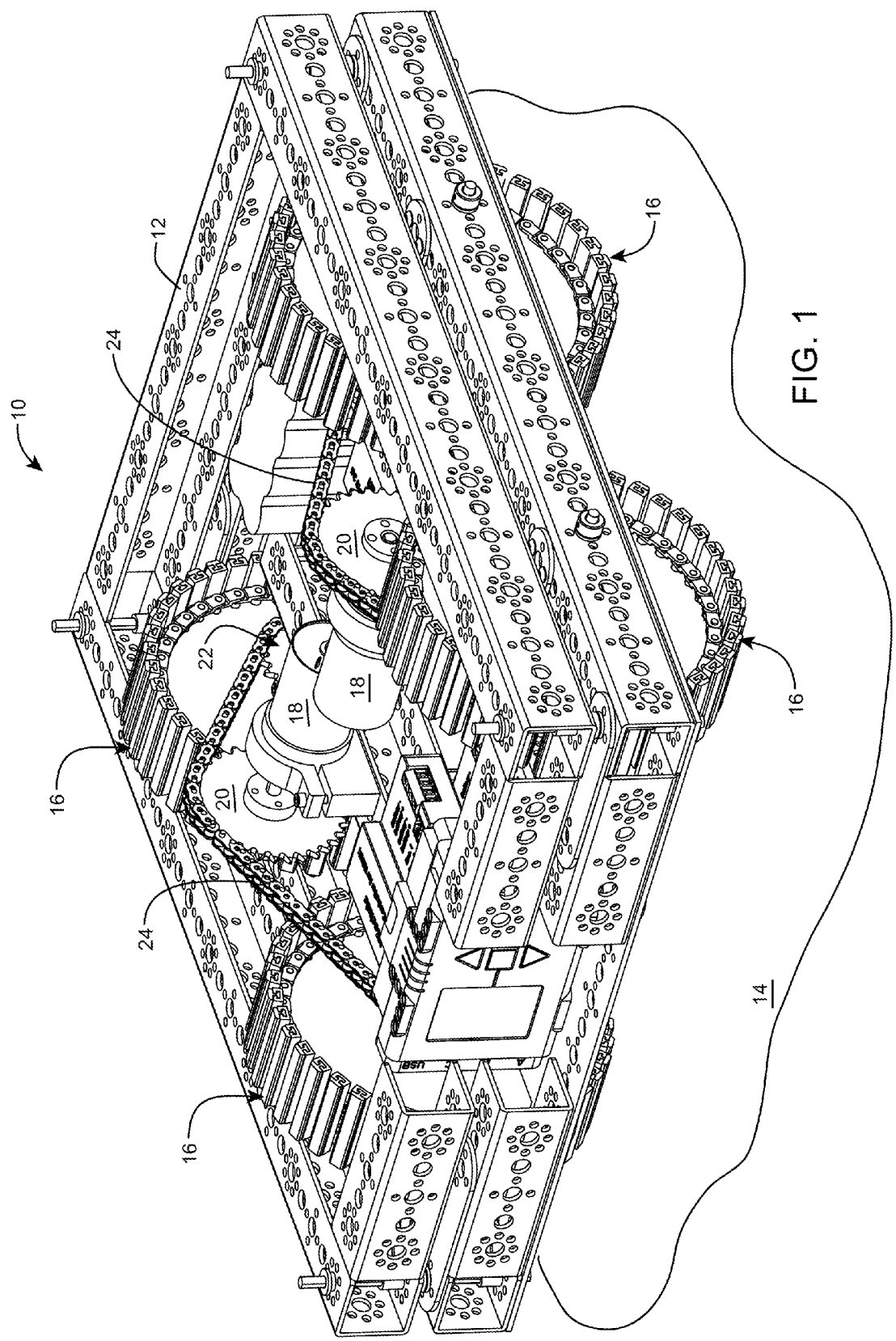
FIG. 1 is a perspective view of an illustrative robotic vehicle provided with specially designed treaded wheels embodying principles of the present invention.

Perspectively illustrated in FIG. 1 is a robotic vehicle 10 having a rectangular frame portion 12 rollingly supported on a surface 14 by a plurality of specially designed treaded wheels 16 (representatively four in number) embodying principles of the present invention. As shown, treaded wheels 16 are grouped in pairs on opposite sides of the frame 12 and may be selectively driven by two electric motors 18 coupled to the wheel pairs by motor sprocket wheels 20 connected to smaller diameter drive sprockets 22 (only one of which is visible) on the wheels 16 by drive chains 24.

As will be seen, the treaded wheels 16 are uniquely constructed and configured in a manner providing the vehicle 10, which may be a vehicle other than the representatively depicted robotic vehicle, with enhanced mobility and traction when being propelled along the surface 14 that may have a combination of a substantial slope, uneven configuration and somewhat slippery texture.

Figure 2:
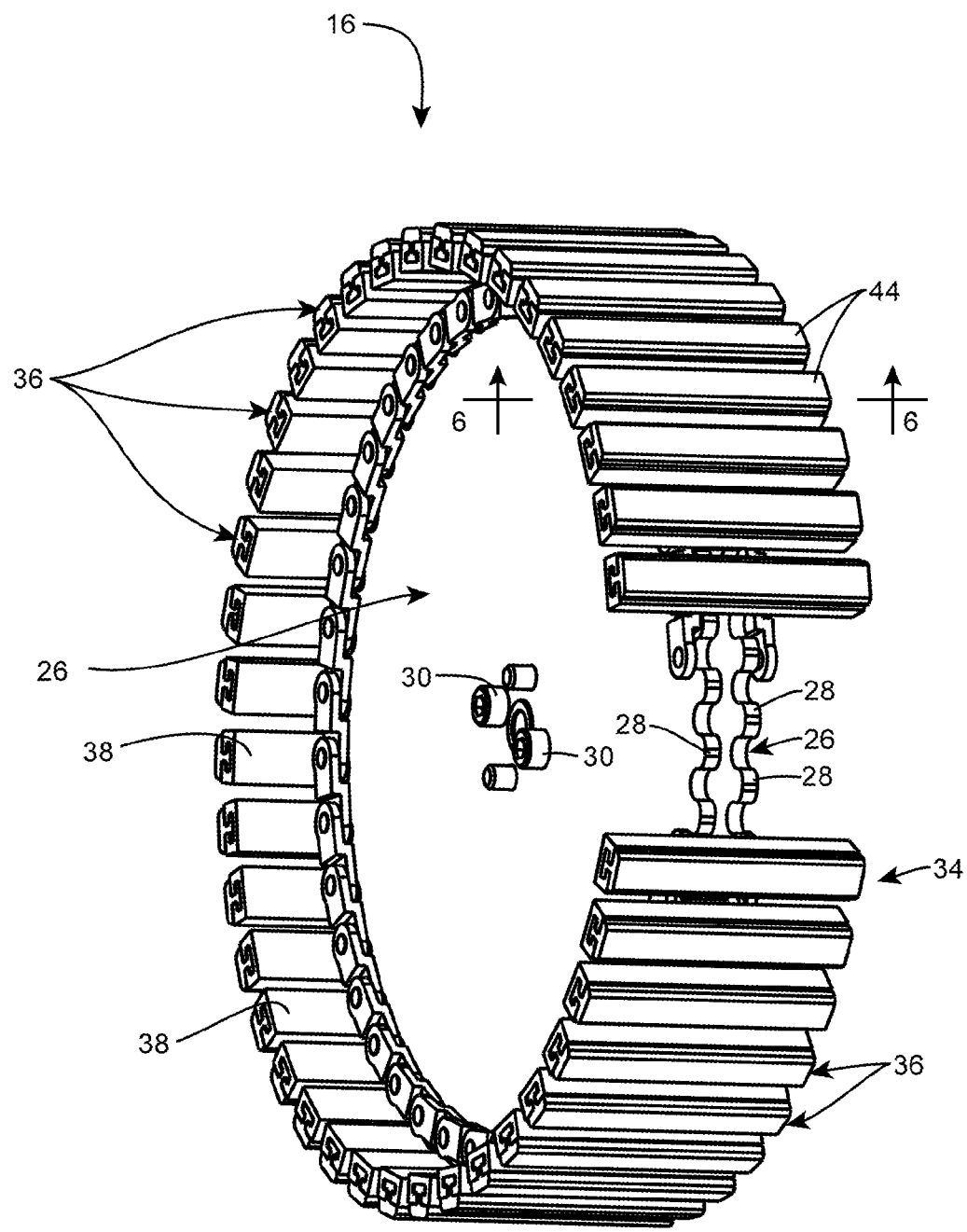
FIG. 2 is an enlarged scale partially cut away perspective view of one of the treaded wheels removed from the vehicle.
Figure 3:
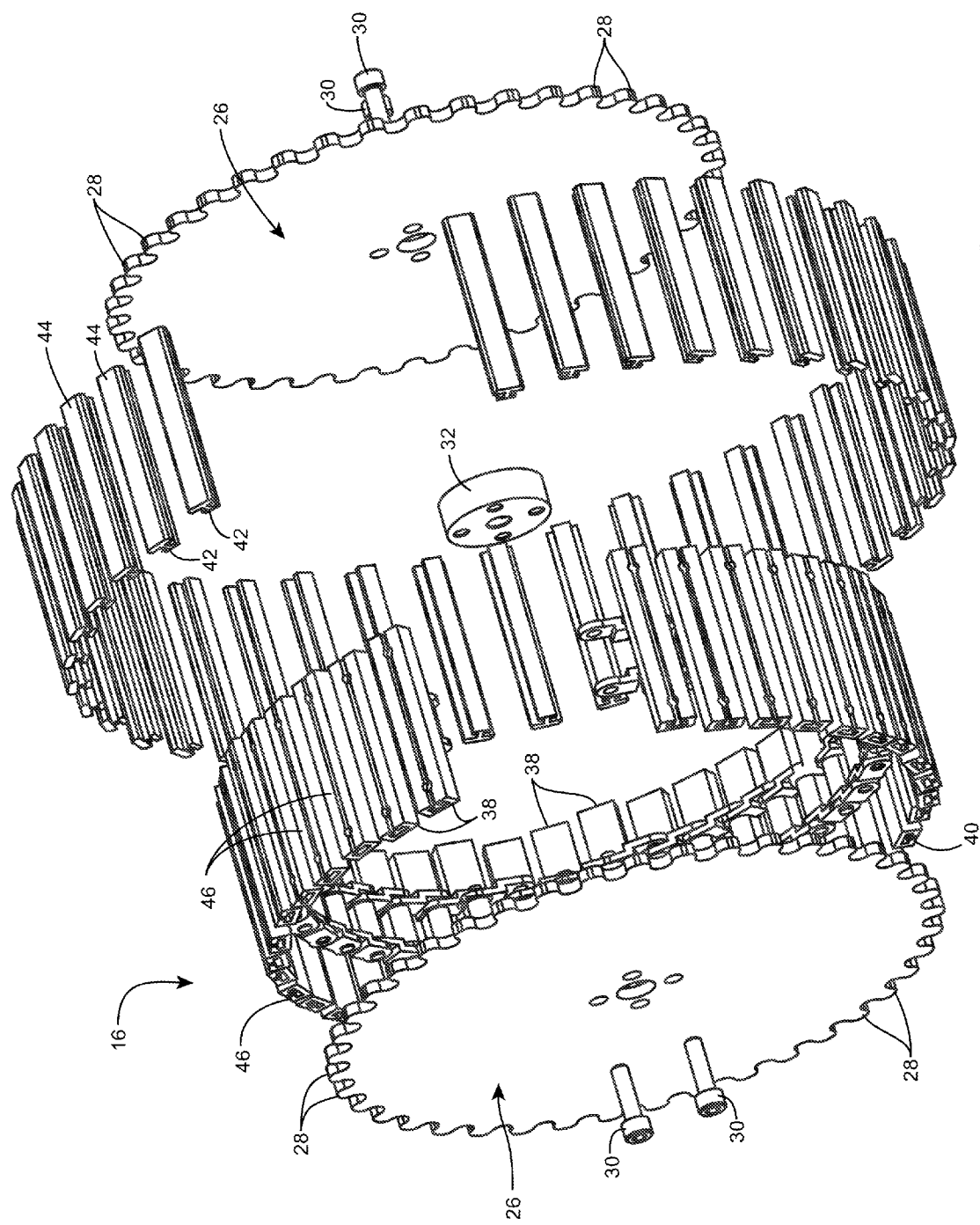
FIG. 3 is an exploded view of the FIG. 2 treaded wheel.

Turning now to FIGS. 2 and 3, each treaded wheel 16 comprises a pair of identical circular wheel plates 26 which together define a relatively rigid wheel structure, with each wheel plate 26 representatively being formed from a resiliently deformable plastic-like material such as LEXAN® and having, around its periphery, a circumferentially spaced series of sprocket teeth 28, each wheel plate 26 having the same number of such sprocket teeth 28. As will be readily appreciated by those of skill in this particular art, other suitable materials, such as a thin metal material, could be alternatively utilized for the wheel plates 26 if desired. The wheel plates 26 are coaxially secured to one another by suitable fasteners 30, in an axially spaced relationship and with their sprocket teeth 28 being circumferentially aligned with one another, on opposite sides of a central hub 32 to form therewith the aforementioned wheel structure.

Circumscribing the dual plate wheel structure 26,26 is a circular tread structure 34 (see FIG. 2) comprising a pivotally interlinked series of tread assemblies 36, the number of such tread assemblies being equal to the number of sprocket teeth 28 on each of the wheel plates 26. As best illustrated in FIGS. 3 and 4, each of the tread assemblies 36 comprises an elongated rectangular plastic (or other suitable material) body 38 having a longitudinally extending slot 40 that receives and captively retains an elongated attachment strip 42 formed on an elongated elastomeric tread member 44 laterally projecting outwardly from an outer side surface 46 of the tread body 38.

Figure 4:
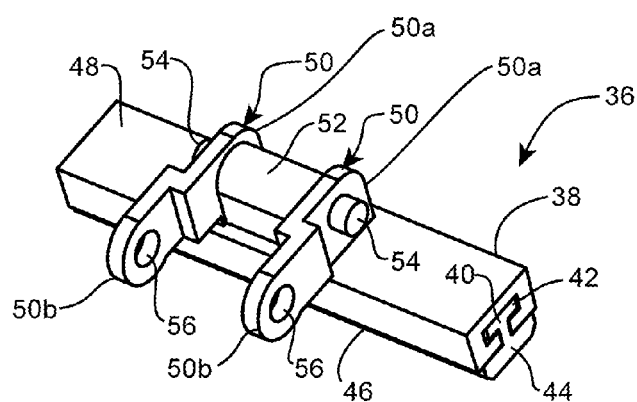
FIG. 4 is an enlarged scale perspective view of a tread link assembly portion of the FIG. 2 treaded wheel.

While different constructions and configurations of the tread assemblies 36 could alternatively be utilized, each tread assembly 36 (as shown in FIG. 4) may be, for the robotic vehicle 10 representatively depicted in FIG. 1, a TETRIX® snap-together tank tread chain link as manufactured by Pitsco Education. Projecting outwardly from the inner side surface 48 of the tread body 38 are two spaced apart tread arms 50 each having laterally offset portions 50a and 50b. A pin body portion 52 extends between the arm portions 50a and has reduced diameter outer end portions 54 that laterally project outwardly beyond the arm portions 50a. Circular apertures 56 extend through outer ends of the arm portions 50b.

Figure 5:
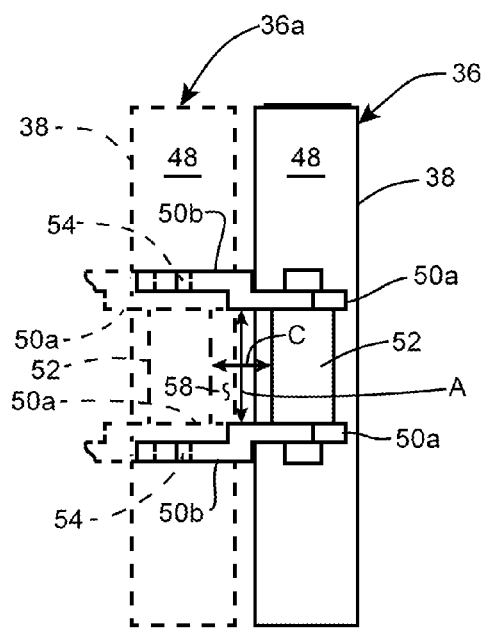
FIG. 5 is a top plan view of the FIG. 4 tread link assembly portion operatively coupled to a circumferentially adjacent tread link assembly portion shown in phantom.

In constructing the treaded wheel 16 shown in FIG. 2 a series of the tread assemblies 36 are simply snapped together to form the circular tread structure 34 that circumscribes the dual plate wheel structure 26,26. FIG. 5 schematically shows the previously described FIG. 4 tread assembly 36 having been snap-fitted to a circumferentially adjacent tread assembly 36a shown in phantom. As illustrated, the arm portions 50b of the tread assembly 36 have been snapped onto the pin ends 54 on the arm portions 50a of the tread assembly 36a.

Figure 6:
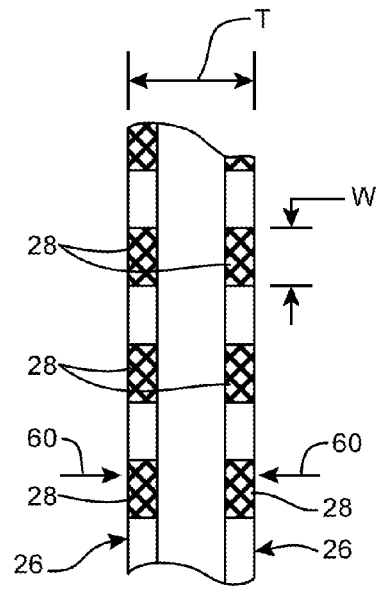
FIG. 6 is a schematic edge view of a circumferential portion of a dual plate wheel structure utilized in the treaded wheel.
Figure 7:
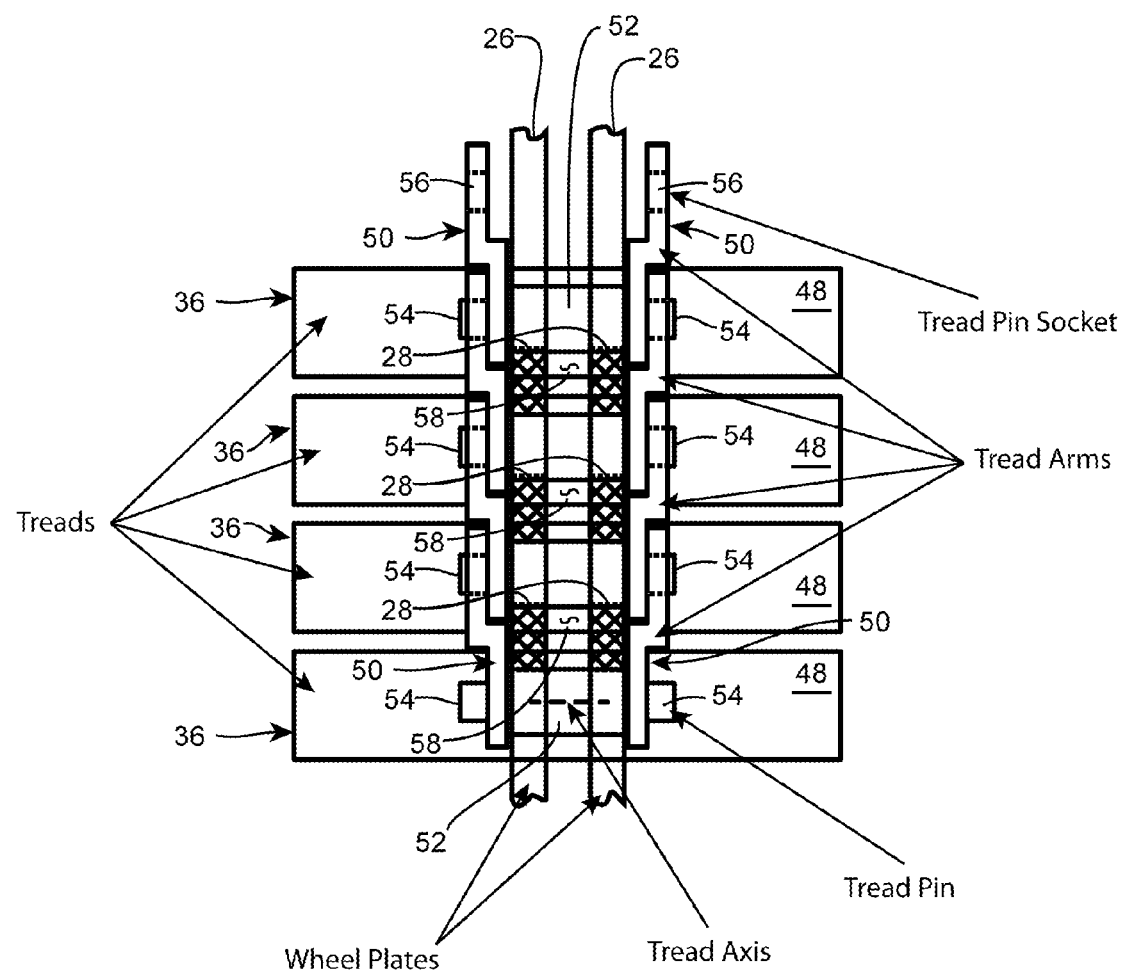
FIG. 7 is an enlarged scale simplified and somewhat schematic cross-sectional view through the treaded wheel taken generally along line 6-6 of FIG. 2.

This interconnection of the two tread assemblies 36,36a forms a cavity 58 between the pin bodies 52 in the tread assemblies 36,36a. The total number of such cavities 58 in the completed circular tread structure 34 is equal to the number of sprocket teeth 28 in each of the wheel plates 26. As can be seen in FIG. 5, cavity 58 extends axially (relative to the axis of rotation of the completed treaded wheel 16) a distance A between the axially facing inner side surfaces of the arm portions 50a of the tread assemblies 36 and 36a, and circumferentially a distance C between the facing side surfaces of their pin bodies 52. Referring now additionally to FIGS. 6 and 7, according to a key aspect of the present invention, these cavity dimensions, the circumferential spacing of the cavities 58 and the wheel plate sprockets 28, the axial thickness T of the dual plate wheel structure 26,26, and the circumferential width W of each sprocket tooth 28, are coordinated as follows.

The circumferential spacing of the cavities 58 is made identical to the circumferential spacing of the wheel plate sprocket teeth 28, the axial thickness T of the dual plate wheel structure 26,26 is made slightly larger than the axial dimension A of the cavities, and the sprocket tooth circumferential width W is made just slightly smaller than the circumferential cavity width C. In connecting the circular tread structure 34 to the periphery of the dual plate wheel structure 26,26, the wheel plate sprocket teeth 28 are inserted into opposite ends of the tread cavities 58 as schematically shown in FIG. 7.

Because the width dimension W of the teeth 28 is just slightly smaller than the cavity dimension C, the facing side surfaces of the circumferentially spaced pin body portions 52 form barriers preventing any substantial relative circumferential movement between the installed circular tread structure 34 and the dual plate wheel structure 26,26. Further, because the wheel structure thickness dimension T is somewhat greater than the cavity dimension A, insertion of the axially opposed pairs of sprocket teeth 28 into the cavities 58 causes each such sprocket tooth pair 28,28 to resiliently deflect toward one another (as indicated by the opposed arrows 60 in FIG. 6) when they enter the cavity 58. This creates an axially directed resilient interference fit between the facing pairs of sprocket teeth 28 and the arm portions 50a of the tread assemblies 36, thereby preventing any substantial relative axial movement between the installed circular tread structure 34 and the dual plate wheel structure 26,26. This combination of constructional and dimensional features of the above-described treaded wheels 16 serves to provide their associated vehicle 10 with both improved mobility and traction on the surface 14.

The foregoing detailed description is to be clearly understood as being given by way of illustration and example only, the spirit and scope of the present invention being limited solely by the appended claims.

What is claimed is:

1. Treaded vehicle wheel apparatus comprising:
   a substantially rigid circular wheel structure rotatable about an axis extending centrally therethrough, said circular wheel structure having a periphery from which a number of circumferentially spaced sprocket structures radially outwardly project; and
   a series of a number of interconnected tread links exactly equal in number to the number of said sprocket structures, disposed in a circular array coaxial with said circular wheel structure and extending externally around said periphery of said wheel structure, and being conjointly rotatable with said wheel structure about said axis, wherein the number of interconnected tread links is equal to the number of circumferentially spaced sprocket structures, and the number of circumferentially spaced sprocket structures is equal to the number of interconnected tread links,
   each circumferentially adjacent pair of said tread links forming an area receiving one of said sprocket structures and having bounding surfaces blocking substantial relative axial and circumferential movement between said wheel structure and said tread link array.

2. The treaded vehicle wheel apparatus of claim 1 wherein:
   each of said sprocket structures is defined by a circumferentially aligned, axially spaced apart and facing pair of sprockets.

3. The treaded vehicle wheel apparatus of claim 2 wherein:
   the sprockets in each axially facing pair thereof are axially and resiliently deflected toward one another, by axially opposing surface portions of the tread link areas receiving the sprocket pairs, in a manner creating a frictional interfit between said sprocket structures and said interconnected tread links.

4. The treaded vehicle wheel apparatus of claim 1 wherein:
   said wheel structure comprises coaxial first and second circular wheel plates separated by a central hub, each said wheel plate having a circumferentially spaced series of outwardly projecting peripheral sprockets thereon, the sprockets on said first and second wheel plates being circumferentially aligned with one another, with axially facing pairs of said sprockets defining said sprocket structures received in said tread link areas.

5. The treaded vehicle wheel apparatus of claim 4 wherein:
   the sprockets in said axially facing pairs thereof are axially and resiliently deflected toward one another, by axially opposing surface portions of the tread link areas receiving the sprocket pairs, in a manner creating a frictional interfit between said sprocket structures and said interconnected tread links.

6. The treaded vehicle wheel apparatus of claim 4 wherein:
   said first and second circular wheel plates are of a plastic material.

7. The treaded vehicle wheel apparatus of claim 1 wherein:
   said tread links are pivotally interconnected to one another.

8. The treaded vehicle wheel apparatus of claim 1 wherein:
   each of said tread links has a relatively rigid body portion extending axially outwardly beyond opposite sides of said wheel structure, and an elastomeric ground engaging portion carried by said body portion and projecting outwardly therefrom.

9. The treaded vehicle wheel apparatus of claim 8 wherein:
   said ground engaging portion has an elongated rectangular configuration and longitudinally extends parallel to said axis.

10. The treaded vehicle wheel apparatus of claim 1 wherein:
    each of said tread links has a plastic body portion and a rubber tread portion secured thereto and projecting outwardly therefrom.

11. The treaded vehicle wheel apparatus of claim 1 wherein:
    each of said tread link areas is bounded by interconnected spaced apart parallel leg pairs of two of said tread links.

12. The treaded vehicle wheel apparatus of claim 1 wherein:
    said treaded vehicle wheel apparatus is a treaded robotic vehicle wheel.

13. The robotic vehicle of claim 1 wherein:
    said sprockets are configured relative to said tread link areas in a manner preventing substantial rotation between said wheel structure and said series of interconnected tread links.

14. A robotic vehicle comprising:
    a body; and
    treaded wheel apparatus operative to support said body for rolling movement along a surface, said treaded wheel apparatus including:
    a wheel structure rotatable about an axis and having first and second peripherally sprocketed circular wheel plates axially separated by a central hub member, the sprockets of said first wheel plate being circumferentially aligned with the sprockets of said second wheel plate to define axially facing sprocket pairs circumferentially spaced around said wheel structure; and a series of interconnected tread links equal in number to said sprocket pairs and being arranged in a circular array extending around the periphery of said wheel structure, each circumferentially adjacent tread link pair forming therebetween an area receiving one of said sprocket pairs and resiliently deforming the sprockets in said one sprocket pair toward one another to create frictional interfits between said sprockets and said tread links.

15. The robotic vehicle of claim 14 wherein:
said first and second circular wheel plates are of a plastic material.

16. The robotic vehicle of claim 14 wherein:
said tread links are pivotally interconnected to one another.

17. The robotic vehicle of claim 14 wherein:
each of said tread links has a relatively rigid body portion extending axially outwardly beyond opposite sides of said wheel structure, and an elastomeric ground engaging portion carried by said body portion and projecting outwardly therefrom.

18. The robotic vehicle of claim 17 wherein:
said ground engaging portion has an elongated rectangular configuration and longitudinally extends parallel to said axis.

19. The robotic vehicle of claim 14 wherein:
each of said tread links has a plastic body portion and a rubber tread portion secured thereto and projecting outwardly therefrom.

20. The robotic vehicle of claim 14 wherein:
each of said tread link areas is bounded by interconnected spaced apart parallel leg pairs of two of said tread links.

\* \* \* \* \*